United States Patent [19]

Yanagi et al.

[11] 3,995,127

[45] Nov. 30, 1976

[54] DEVICE FOR AUTOMATICALLY STOPPING HIGH-ALTITUDE WORKING VEHICLE IN RESPONSE TO OVERLOAD

[75] Inventors: Hiroaki Yanagi, Suita; Shigeyoshi Kitano, Habikino, both of Japan

[73] Assignee: Morita Pump Kabushiki Kaisha, Osaka, Japan

[22] Filed: Nov. 13, 1974

[21] Appl. No.: 523,338

[52] U.S. Cl. .......... 200/52 R; 200/81 R; 182/19

[51] Int. Cl.² .......... H01H 35/00; C05B 11/00

[58] Field of Search .......... 182/2, 12, 18, 19; 200/52 R, 56 R, 81.8, 81 R; 318/466, 481, 469

[56] References Cited

UNITED STATES PATENTS

| | | | |
|---|---|---|---|
| 3,533,294 | 10/1970 | Fahy | 200/818 X |
| 3,670,849 | 6/1972 | Milner, Jr. | 182/19 |
| 3,825,704 | 7/1974 | Brauer | 200/81.8 X |
| 3,860,029 | 1/1975 | Hubler | 318/481 X |
| 3,860,088 | 1/1975 | Gettatly | 182/19 X |

*Primary Examiner*—James R. Scott
*Attorney, Agent, or Firm*—Hall & Houghton

[57] ABSTRACT

There is provided a device for automatically stopping the movement of a high-altitude working vehicle in response to overload thereon. The device detects a bending moment load on the ladder or tower of the working vehicle by means of an oil pressure gauge which through a switching mechanism stops the further movement of the ladder or the tower when the latter is overloaded.

1 Claim, 4 Drawing Figures

DEVICE FOR AUTOMATICALLY STOPPING HIGH-ALTITUDE WORKING VEHICLE IN RESPONSE TO OVERLOAD

BACKGROUND OF THE INVENTION

1. Field of the Invention

The present invention relates to a safety device for use with a high-altitude working vehicle equipped with a vertically and horizontally swingable and extensible ladder assembly or a tower unit in which the movement of the ladder assembly or tower unit will be automatically stopped when such assembly or unit is subjected to an overload, thereby insuring the safety of the vehicle.

2. Description of the Prior Art

Generally, in a high-altitude working vehicle containing an extensible ladder assembly or tower unit, when the ladder assembly or tower unit is extended or contracted or vertically swung, the bending moment load on the ladder assembly or tower unit will change, and if an overload thereby occurs, the ladder assembly or tower unit may be broken or toppled over together with the vehicle body.

Heretofore, the detection of the bending moment load has been achieved by an arrangement comprising a beam extending along the base portion of a tower, the front end of the beam being fixed to the tower by means of bolts with the opposite or rear end of the beam being free, so that a bending load on the tower is converted into a displacement of the free end of the beam. Thus, when the tower is in a horizontal position, the tower will be bent in such a manner as to bring its front end nearest to the ground. Therefore, the front end of the beam is positioned below the level of the rear end. In other words, the free end of the beam will be upwardly displaced. This displacement is transmitted to a pointer through a segment gear, a rotatable arm and a pinion so that it may be read on an indicator plate. A switch is provided at a position corresponding to the allowable load limit and is adapted to be actuated by the rotatable arm to automatically stop the movement of the tower.

With this arrangement, however, flexure due to the self-weight of the beam will be found to influence the detected value, thus leading to an error. When the tower is in its vertical position, such flexure due to the self-weight of the beam becomes zero, since the beam will then be in its vertical position. As the beam is moved toward its horizontal position, the flexure will be found to increase. This error is very complex and can hardly be corrected.

SUMMARY OF THE INVENTION

The present invention eliminates the above-mentioned disadvantages found to be inherent in the prior art devices and is adapted to hydraulically detect the self-weight of a tower and a bending moment load acting on a tower support member and to actuate in an emergency a microswitch contained in an oil pressure gauge, thereby stopping the movement of the tower.

DESCRIPTION OF THE PREFERRED EMBODIMENTS

Figure 1:
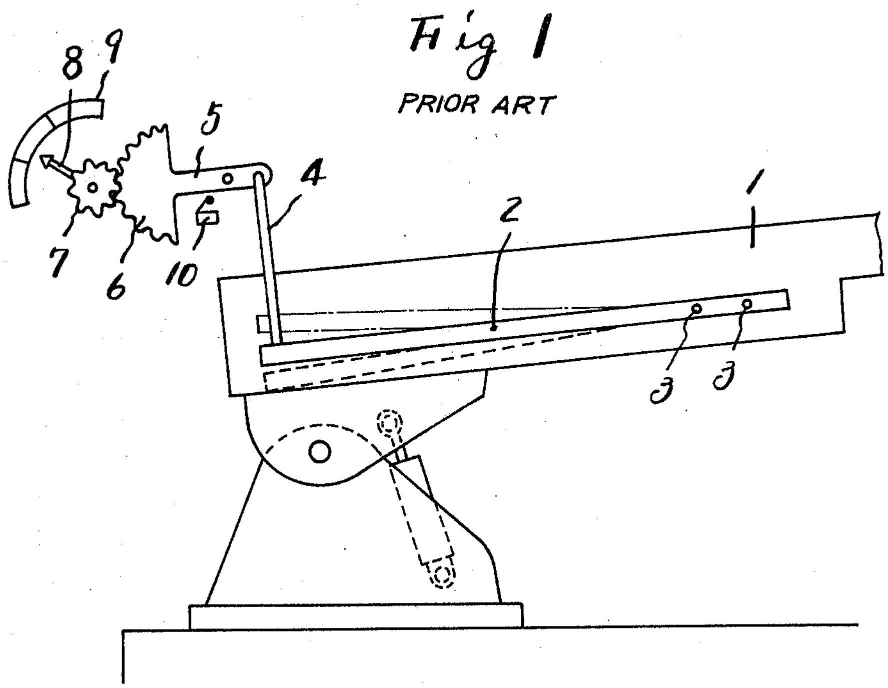
Fig 1 PRIOR ART
FIG. 1 is a schematic view of the principal parts of a conventional prior art device for detecting overloads on a high-altitude working vehicle.

Reference is now to be had to FIG. 1 which illustrates a conventional prior art device. As shown in FIG. 1, the arrangement comprises a beam 2 extends along the base portion of a tower 2, with the front end of the beam 2 being fixed to the tower 1 by any suitable means, such as by bolts 3 and the rear end of the beam being free from attachment. This construction results in the bending load on the tower 1 being converted into a displacement of the free end of the beam. Thus, when the tower 1 is in a horizontal position, as is shown in FIG. 1, the tower 1 will be bent in such a manner as to bring its front end nearest to the ground. Therefore, the front end of the beam 2 will be positioned below the level of its rear end. In other words, the free end of the beam will be upwardly displaced. This displacement will be transmitted to a pointer 8 through a segment gear 6, a rotatable arm and a pinion 7, so that such displacement may be read on an indicator plate 9. A switch 10 is provided at a position corresponding to the allowable load limit and is adapted to be actuated by the rotatable arm 5 to automatically stop the movement of the tower 1.

With this arrangement, however, flexure due to the self-weight of the beam influences the detected value, thus leading to an error. When the tower 1 is in its vertical position, such flexure due to the self-weight of the beam 2 becomes zero since the beam 2 is then in its vertical position. As the beam is moved toward its horizontal position, the flexure will be found to increase. This error is very complex and is quite difficult to correct.

Figure 2:
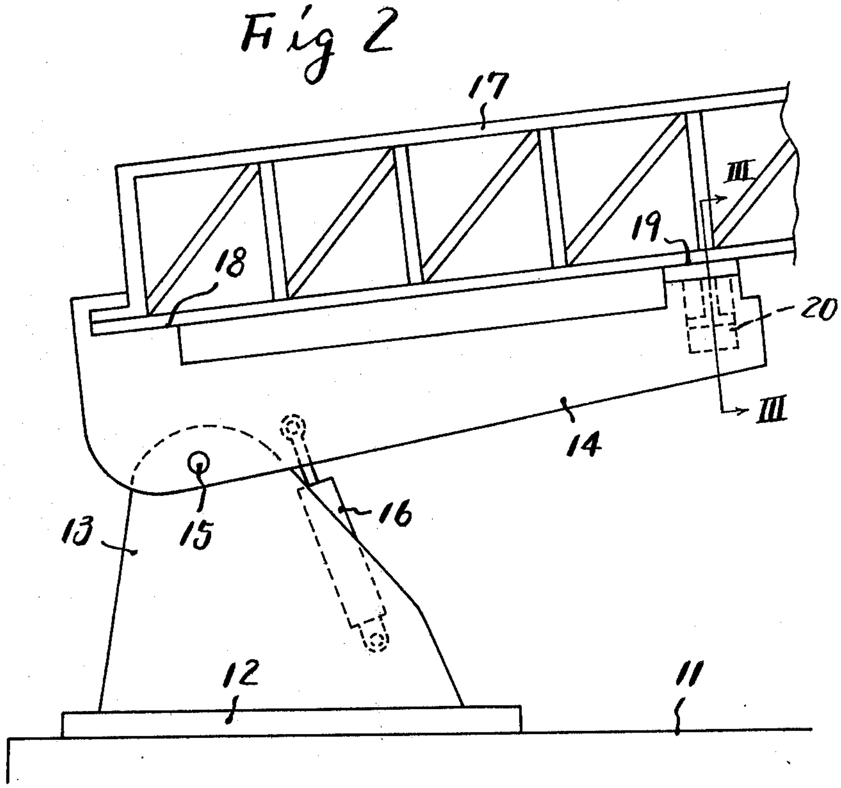
FIG. 2 is a schematic view of the principal portions of a device made in accordance with the present invention.

Reference is now to be had to FIG. 2 wherein a detecting and stopping device made in accordance with the present invention is shown. As illustrated, a vehicle body 11 is fragmentarily shown with a turntable 12 being mounted adjacent its rear end. A fixed support frame 13 is mounted on the turntable 12 in a conventional manner. A support member 14 is rotatably mounted at one end to the upper end of the support frame 13 by means of a pivot element 15. A hydraulic cylinder 16 is connected between the fixed support frame 13 and the rotatable support member 14 so as to control the vertical swing or pivotal action of the rotatable support member 14. A tower 17 is mounted in operative relationship to the rotatable support member 14. The hydraulic cylinder 16 is installed between the fixed support frame 13 and the rotatable support frame 14 so that the extension and contraction thereof will cause the vertical swing of the tower 17 mounted on the support frame 14 around the axis of the pivot 15.

Figure 3:
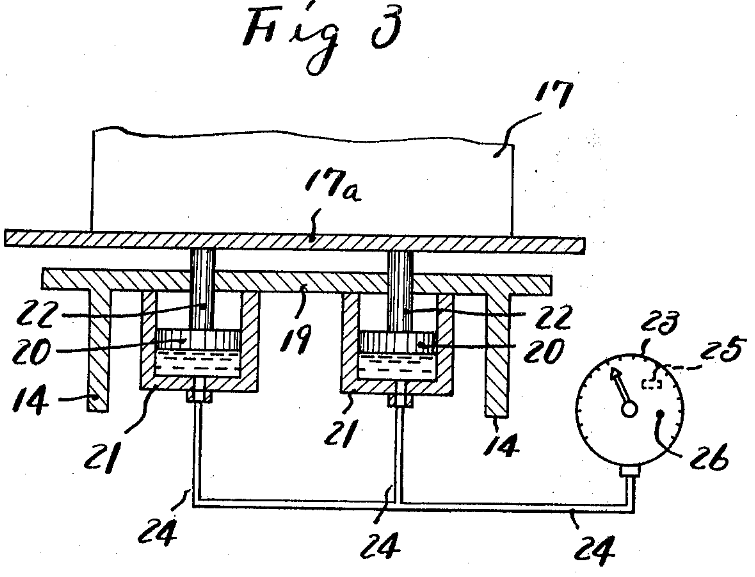
FIG. 3 is a section taken along the line III — III of FIG. 2.

The tower 17 is supported at two points on pillow plates 18 and 19, which are provided on the front and rear ends of the rotatable support frame 14. In this case, the rear end of the rotatable support frame 14 and the tower 17 are fixedly secured to one another, while the front end supports the tower in a flatable or free manner by means of hydraulic pistons 20. Thus, as shown in FIG. 3, two cylinders 21 are fixed to the lower surface of the pillow plate 19 and the hydraulic pistons 20 are tightly fitted in sealed relation in the cylinders 21. The hydraulic pistons 20 are provided with piston rods 22 extending upwardly therefrom through the pillow plate 19. The upper ends of the piston rods 22 are provided with a lower surface plate 17*a* for receiving the tower 17. The piston back chambers of the cylinders 21 are filled with oil and are connected to an oil pressure gauge 23 through oil pipe lines 24. A limit switch 25 is mounted on the oil pressure gauge adjacent a pressure graduation corresponding to the allowable load. In lieu of the pressure gauge 23, a Bourdon tube pressure gauge provided with a contact adjusting screw 26 may be provided.

With the arrangement described hereinbefore, a bending moment load on the tower 17 acts on the hydraulic pistons 20 through plate 17*a*, so that a pressure corresponding to that of the bending moment load is exerted in the oil contained in the piston back chambers, such pressure being indicated on the oil pressure gauge 23. Since the limit switch 25 is located adjacent a pressure graduation corresponding to that of the allowable load, the limit switch 25 will be actuated if the bending moment load reaches the allowable value. The actuation of the limit switch 25 will automatically stop the movement of the tower 17. The hydraulic pistons 20 are capable of directly detecting the bending moment loads on the tower 17 and there is no possibility of errors occurring as in the case of the conventional beam of free end construction as shown in the prior art embodiment of FIG. 1. Therefore, an accurate detection of the bending moment load can be achieved with the present invention.

Figure 4:
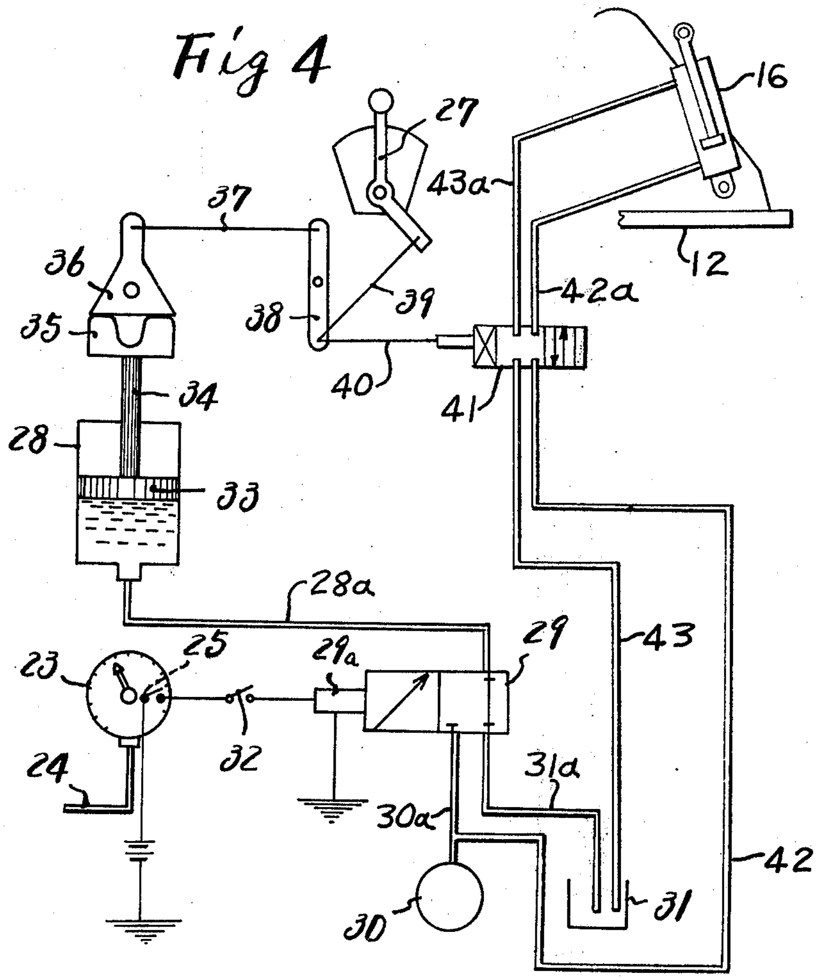
FIG. 4 is a schematic view of one form of an automatic stopping device made in accordance with the present invention.

Reference is now to be had to FIG. 4 wherein an illustrative embodiment of one form of operating lever designated by reference 27, which will be herein described as an extension and contraction operating lever, is provided. The operating lever 27 actuates a master cylinder which, in turn, actuates an extending and contracting mechanism for the movement of the tower 17. The extending and contracting mechanism to be employed may be any conventional mechanism of this type which is readily available. Therefore, any further and detailed description to such mechanism is deemed to be unnecessary. The operating lever 27 may be manually movable to a neutral position, an extension position and a contraction position.

Reference numeral 28 designates a hydraulic cylinder for automatically returning the operating lever 27 to its neutral position, the hydraulic cylinder 28 being connected to a hydraulic pump 30 and to an oil tank 31 in a changeover fashion by a solenoid valve 29 through oil lines 28*a*, 30*a*, and 31*a*, respectively. The solenoid valve 29 is so constructed that when its solenoid 29*a* is energized it connects the hydraulic pump 30 to the hydraulic cylinder 28 through oil lines 30*a* and 28*a* to oil into the latter. When the solenoid 29*a* is in its deenergized condition on the other hand, it connects the oil tank 31 through oil line 31*a* to the hydraulic cylinder 28 to render the latter free. The limit switch 25 hereinbefore described and which is mounted on gauge 23 and a manual switch 32 are serially placed in an electric circuit for the operation of the solenoid 29*a*.

A piston 33 is positioned in the hydraulic cylinder 28 and a cam 35 is provided on the front end of a piston rod 34. A cam follower 36 is associated with the cam 35 and is connected to an intermediate lever 38 through a link 37, the intermediate lever 38 being connected to the tower operating lever 27 by a link 39. The intermediate lever 38 is also connected at its lower end to the hydraulic cylinder 16 through connecting rod or link 40 and the oil pressure switch valve 41. The oil pressure switch valve 41 is connected on one side through oil line 42 to the hydraulic pump 30 and through line 43 to the oil tank 31, and on the opposite side through oil lines 42*a* and 43*a* to the hydraulic cylinder 16 which controls the vertical swing or pivotal action of the support member 14.

If the manual switch 32 is in a closed position and the limit switch 25 is in an open position, the solenoid 29*a* of the solenoid valve 29 will be in a deenergized state, so that the hydraulic cylinder 28 will be connected to the oil tank 31, thus enabling the piston 33 to be freely moved. With the mechanism in this condition, the tower operating lever 27 can be freely manipulated. In the event the operating lever 27 is moved to an extension position for carrying out high-altitude work, and if, during the working, the bending moment load acting on the tower 17 reaches its allowable value, the limit switch 25 will be actuated. The energizing of the switch 25 actuates the solenoid valve 29 to supply the hydraulic cylinder 28 with oil under pressure from the oil pump 30. As a result, the piston 33 will be actuated to cause the cam 35 to bring the cam follower 36 back to its neutral position. This motion is transmitted to the tower operating lever 27 through the link 37, intermediate lever 38 and link 39, causing the tower operating lever 27 to return to its neutral position. The operating lever 27 will then be locked in this condition thus preventing damage to the tower 17 or toppling of the vehicle. The operating lever 27 may be used for extending and contracting and vertically and horizontally swinging the tower 17, and thus it would be possible to stop the three motions at the same time. When it is desired to return the tower 17 to a safe position after the tower operating lever 27 has been locked by the actuation of the automatic stopping device, this may be accomplished by opening the manual switch 32.

While there have been described herein what are at present considered preferred embodiments of the several features of the invention, it will be obvious to those skilled in the art that modifications and changes may be made without departing from the essence of the invention. It is therefore to be understood that the exemplary embodiments thereof are illustrative and not restrictive of the invention, the scope of which is defined in the appended claims and that all modifications that come within the meaning and range of equivalency of the claims are intended to be included therein.

We claim:

1. A device for automatically stopping the movement of a high-altitude working vehicle in response to overload thereon comprising support frame means mounted on a high-altitude working vehicle, ladder or tower means pivotally mounted at one end to said support frame means, hydraulic piston means connected between said frame means and said ladder or tower means to control the pivotal movement of said ladder or tower means relative to said support frame means, fluid pressure gauge means operatively connected to said hydraulic piston means to register the self-weight of the ladder or tower means and the bending movement load imposed thereon, stop means positioned on said gauge means registering the safe load value for said ladder or tower means, switch means operatively connected to said stop means, said switch means being energized when the load value on said ladder or tower means reaches the stop means of said gauge means, and motion stop means operatively connected to said ladder or tower means and to said switch means whereby upon energization of said switch means said motion stop means will be actuated to stop any further movement of the ladder or tower means beyond its safe load value.

* * * * *